Figure 1:
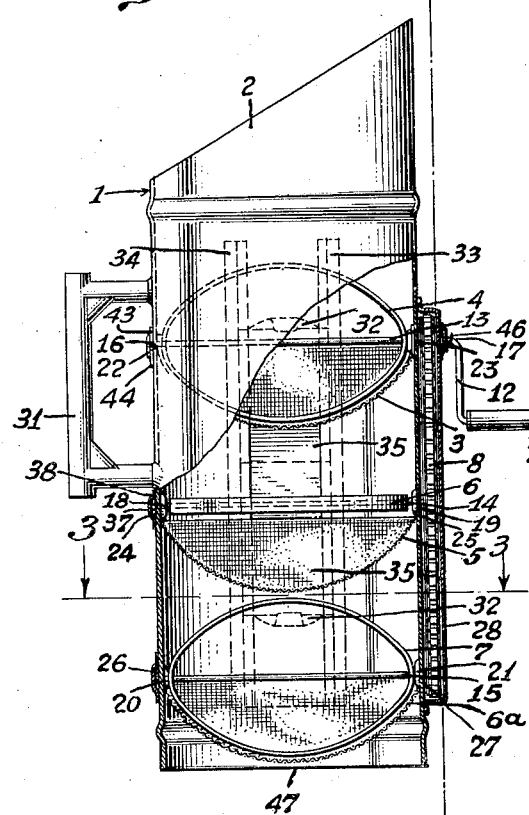
Figure 2:
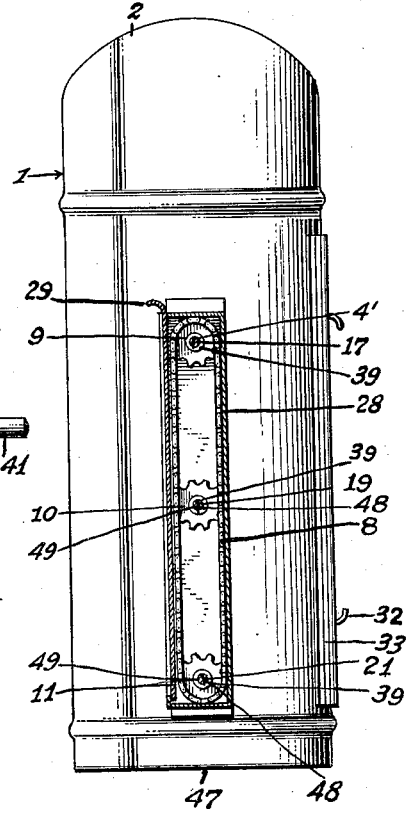
Figure 3:
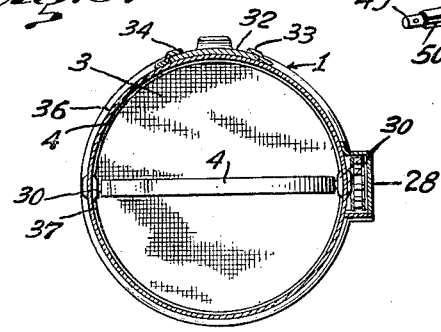
Figures 4, 5, 6:
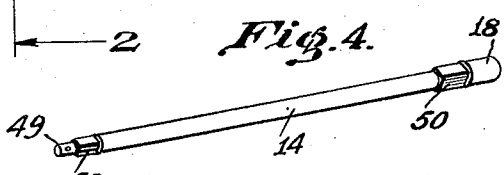

Nov. 3, 1931.  G. N. BARROW  1,830,525

COMBINED STRAINER, SIFTER, AND MIXER

Filed Jan. 18, 1930

INVENTOR.
Gus N. Barrow.
BY
ATTORNEY.

Patented Nov. 3, 1931

1,830,525

UNITED STATES PATENT OFFICE

GUS N. BARROW, OF LOS ANGELES, CALIFORNIA

COMBINED STRAINER, SIFTER, AND MIXER

Application filed January 18, 1930. Serial No. 421,768.

My invention relates to improvements in mechanism and apparatus for straining, sifting, mixing, and separating fluids, substances, and matter, by a process of causing the fluid or substance or matter to pass through porous substance.

The objects of my invention are:

a. To separate the constituents of fluids and matter;

b. To separate solids from liquids;

c. To reduce the sizes of lumps of congealed matter;

d. To mix substances.

I obtain these objects by the mechanism illustrated in the accompanying drawings, in which Figure I is a vertical side view of the apparatus, with part of the container 1 cut away to illustrate a section of the apparatus; Figure II is a front view of the apparatus showing the exterior of the container 1, and showing the beaters, axles, sprockets and chain, the rectangular cover having been removed from the normal position of guarding said chain and sprockets; Figure III is a cross section of the apparatus; Figure IV shows shafts around which the beaters rotate; Figure V shows guard closed over end of a shaft; Figure VI shows the same guard turned to release the shaft.

Similar numerals refer to similar parts throughout the several views.

Figure I: The container 1 is open inside and is arranged so that fluid or substance or matter, when released at the end 2 of the container 1, passes to a porous substance 3 through which the matter passes freely or under force of beater 4. Some of the fluid or substance or matter may fail to pass through porous substance 3, and is held against 3. The rest of the fluid or substance or matter, passes through 3, and reaches porous substance 5, and freely, or under pressure of beater 6, passes through 5. Some of this fluid or substance or matter may not pass through 5 and therefore remains in a position illustrated to be just above and next to 5. Then the fluid or substance or matter contiues and passes through porous substance 6, freely or under pressure of beater 7. Some of the matter passes through the latter, as next above porous substance 6a. Beaters 4, 6, and 7, are positioned so as to rotate without touching each other, and by means of chain 8 which operates over sprockets 9, 10, and 11 (Figure II) by means of crank 12, operating on shafts 13, 14, and 15, which terminate with axles 16, 17, 18, 19, 20, and 21, the axles protruding through openings 22, 23, 24, 25, 26, and 27 in the sides of the container 1. On one axle of each of the shafts, is attached one of said sprockets. Shafts 13, 14, and 15, pass through a rectangular hole in the opposite sides of each beater 4, 6, and 7, and through rectangular holes in washers 30 which intervene the walls of the container 1 and the outer rims of beaters 4, 6, and 7. 28 is a guard covering chain 8 and sprockets 9, 10, and 11. Beaters 4, 6, and 7, are separated from the walls of container 1 by flat washers 36. 31 is a handle for holding the entire apparatus. 32 is a movable slide held in position by guides 33 and 34. This slide 33 covers an opening 35 in the side of container 1. The guides 33 and 34 may be attached to the outside of container 1 or may be made by specially shaping the ends of the material constituting the sides of the opening 35. 37 indicates movable guards through the upper end of which is a pivotal means 38 of fastening that upper end to the outside of the container 1, so as to allow the guards 37 to swing around said pivotal means 38, as on a pivot, so as to allow the shafts 14 and 15 to pass through openings 23 and 24, when these shafts 14, and 15 are to be removed from the entire apparatus. The front side of sprocket 10, and of sprocket 11, has, each, a flange 39 through which is a hole 48 corresponding with a similar hole 49 in the shafts 14 and 15. Into each of these holes is secured a pin 40 which fastens the sprockets 10 and 11 to the shafts 14 and 15. The top shaft 13 is a one piece crank shaft composed of handle 41, crank 12 and shaft 13. This crank shaft may be removed from the container 1 by being pulled out from the front of container 1. When in normal operating position, this crank shaft is secured in place by a pin which is secured in a hole in that end of the shaft in the handle 31 shown in the drawing. Next to this pin 42 is a flat washer 43. Next to this flat washer 43 is a reinforcement 44 fastened to container 1 to prevent wear on this flat washer 43 and container 1. On the front of the guard 28 this crank shaft passes through a flat washer 45 operating between the front of this guard 28 and pin 46, which is secured in a hole through the crank shaft.

This entire apparatus may be adapted to many uses. It may be used without the handle 31. What the drawings show to be the upper end 2 and lower end 47 may be shaped differently from the way they are shown in Figures I and II. For instance, the ends 2 and 47 may be attached to or connected with other devices and apparatuses, without changing the uses or advantages of my said invention. Instead of the crank 12 and handle 41, a pulley may be installed, for operating the mechanism by a motor. The beaters 4, 6, and 7, need not be circular or elliptical; but may be of any shape to correspond to the shape of the inside of the container 1, or to correspond to the shape of the porous substance 3, 5, and 6a.

Figure II is the front view of the apparatus showing that the assembly of chain 8 and sprockets 9, 10, and 11, are covered by a guard 28, one side of the guard 28 being open and covered with a slide 29 which can be removed for cleaning or repairing this chain and sprocket assembly. 33 is a guide holding slide 32. 2 and 47 are ends of the container 1. The front side of sprocket 10, and of sprocket 11, has, each, a flange 39 through which is a hole 48 corresponding with a similar hole 49 in the shafts 14 and 15. Into each of these holes is secured a pin 40 which fastens the sprockets 10 and 11 to the shafts 14 and 15, as described in Figure I.

Figure III is a cross section of the apparatus, minus handle 31 and crank 12. 1 is the container. 33 and 34 are guides holding slide 32. 3, 5, and 6a, are the porous substances, edges of which are indicated by 36. This porous substance is tightly held in place by rim 37. 30 are flat washers. 13 is a shaft. 28 is the guard covering chain assembly 8. 29 is the slide covering the open side of guard 28.

Figure IV shows one of the shafts. At the readers left, the extreme end of the shaft forms round axles 18 and 21 which rotate in openings 23 and 24 in the sides of the container 1. 50 are rectangular flanges that fit into the rectangular openings in opposite sides of the beaters. These rectangular flanges cause the beaters 4, 6, and 7, to rotate with the shafts 14 and 15. 49 is the hole containing pin 40 fastening sprocket to shafts 14 and 15. Between the hole 49 and the nearest flange 50, the shafts 14 and 15 are round, constituting axles rotating through holes in the front of the container 1 and through flat washers.

Figure V shows the pivotal guards 37 covering the ends of shafts 14 and 15. This figure shows the guards in normal position, covering the axle ends of shafts 14 and 15.

Figure VI is the same as Figure V, excepting that Figure VI shows the guards 37 turned upward on its pivot 38, so that shafts 14 and 15 may be pulled out through the side of the container 1 as described in Figure I.

I claim:

1. A sifter comprising a tubular casing having oppositely disposed shaft openings, screens mounted in the casing adjacent the openings, shafts extending through the openings and one of the shafts of a greater length than the other shafts and bent to provide a crank handle located exteriorly of the casing, beaters for the screens removably secured to the shafts, sprocket gears secured to the shafts, a sprocket chain connecting the gears, and guards pivoted to the casing to overlie the openings at one side of the casing and the ends of the shafts journalled in the respective openings.

2. A sifter comprising a casing, spaced screens in the casing, shafts journalled in the casing adjacent the screens, beaters secured to the shafts, a housing secured to one side of the casing and exteriorly thereof with the shafts extending therein and one of the shafts projecting beyond the housing and bent to provide a crank handle, sprocket gears on the shafts within the housing, a sprocket chain connecting the gears, and a removable closure for the housing.

GUS N. BARROW.